US010312499B2

United States Patent
Yu et al.

(10) Patent No.: US 10,312,499 B2
(45) Date of Patent: Jun. 4, 2019

(54) COATING PARTICLES OF ACTIVE ELECTRODE MATERIAL FOR LITHIUM SECONDARY BATTERIES

(71) Applicant: GM GLOBAL TECHNOLOGY OPERATIONS LLC, Detroit, MI (US)

(72) Inventors: Zhiqiang Yu, Shanghai (CN); Xiaohong Q. Gayden, West Bloomfield, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 177 days.

(21) Appl. No.: 15/508,138

(22) PCT Filed: Sep. 8, 2014

(86) PCT No.: PCT/CN2014/086086
§ 371 (c)(1),
(2) Date: Mar. 2, 2017

(87) PCT Pub. No.: WO2016/037304
PCT Pub. Date: Mar. 17, 2016

(65) Prior Publication Data
US 2017/0309888 A1     Oct. 26, 2017

(51) Int. Cl.
*H01M 4/00* (2006.01)
*H01M 4/04* (2006.01)
(Continued)

(52) U.S. Cl.
CPC ......... *H01M 4/0428* (2013.01); *H01M 4/139* (2013.01); *H01M 10/0525* (2013.01)

(58) Field of Classification Search
CPC . H01M 4/0428; H01M 10/0525; H01M 4/139
See application file for complete search history.

(56) References Cited

U.S. PATENT DOCUMENTS

| 3,485,586 A | 12/1969 | Swaney et al. |
| 2002/0170169 A1* | 11/2002 | Gonzalez ............ H01M 4/0404 29/623.5 |

(Continued)

FOREIGN PATENT DOCUMENTS

CN           103545485 A        1/2014

OTHER PUBLICATIONS

International Search Report and Written Opinion for application No. PCT/CN2014/086086, dated May 27, 2015; 9 pages.

*Primary Examiner* — Cynthia H Kelly
*Assistant Examiner* — Monique M Wills
(74) *Attorney, Agent, or Firm* — Reising Ethington P.C.

(57) ABSTRACT

Particles of active electrode material for a lithium secondary battery are coated with a precursor material which is either a carbon-based polymer or a metal and oxygen containing compound. The precursor material-coated particles are injected into a gas stream and momentarily exposed to an atmospheric plasma at a predetermined energy level and temperature up to about 3500° C. The plasma treatment converts (i) the carbon polymer to submicron size carbon particles or (ii) the metal compound to metal oxide particles on the surfaces of the particles of electrode material. In preferred embodiments of the invention the plasma treated coated active electrode material particles are carried by the gas stream and deposited onto an electrode material bearing substrate for a lithium battery cell.

18 Claims, 2 Drawing Sheets

(51) Int. Cl.
*H01M 4/139* (2010.01)
*H01M 10/0525* (2010.01)

(56) References Cited

U.S. PATENT DOCUMENTS

2015/0014890 A1* 1/2015 Xiao .................. H01M 4/0471
    264/446
2015/0056507 A1* 2/2015 Dadheech ............ H01M 4/366
    429/218.1
2015/0162602 A1* 6/2015 Dadheech ............ H01M 4/366
    429/231.5

* cited by examiner

COATING PARTICLES OF ACTIVE ELECTRODE MATERIAL FOR LITHIUM SECONDARY BATTERIES

TECHNICAL FIELD

This disclosure pertains to the coating of micrometer-size particles of active electrode materials for lithium secondary batteries with a carbon polymer or with a metal oxide-precursor compound, and the subsequent processing of a gas-borne stream of the coated active material particles in an atmospheric plasma to heat and transform the coatings such that the active electrode material particles discharged from the plasma are coated with small particles of carbon or with small particles of metal oxide for enhancing the performance of the respective anode and cathode materials. It is preferred to direct the newly coated particles of electrode material in the plasma stream directly onto a surface of a current collector or an electrode separator component in the making of a battery.

BACKGROUND OF THE INVENTION

Assemblies of lithium-ion battery cells are finding increasing applications in providing motive power in automotive vehicles. Lithium-sulfur cells are also candidates for such applications. Each lithium-ion cell of the battery is capable of providing an electrical potential of about three to four volts and a direct electrical current, based on the composition and mass of the electrode materials in the cell. The cell is capable of being discharged and re-charged over many cycles. A battery is assembled for an application by combining a suitable number of individual cells in a combination of electrical parallel and series connections to satisfy voltage and current requirements for a specified electric motor. In a lithium-ion battery application for an electrically powered vehicle, the assembled battery may, for example, comprise a few hundred to a thousand individually packaged cells that are electrically interconnected to provide forty to four hundred volts and sufficient electrical power to an electrical traction motor to drive a vehicle. The direct current produced by the battery may be converted into an alternating current for more efficient motor operation.

In these automotive applications, each lithium-ion cell typically comprises a negative electrode layer (anode, during cell discharge), a positive electrode layer (cathode, during cell discharge), a thin porous separator layer interposed in face-to-face contact between parallel, facing, electrode layers, and a liquid, lithium-containing, electrolyte solution filling the pores of the separator and contacting the facing surfaces of the electrode layers for transport of lithium ions during repeated cell discharging and re-charging cycles. Each electrode is prepared to contain a layer of an electrode material, typically deposited as a wet mixture on a thin layer of a metallic current collector.

For example, the negative electrode material has been formed by depositing a thin layer of graphite particles, or of lithium titanate particles, and a suitable polymeric binder onto one or both sides of a thin foil of copper which serves as the current collector for the negative electrode. The positive electrode also comprises a thin layer of resin-bonded, porous, particulate lithium-metal-oxide composition bonded to a thin foil of aluminum which serves as the current collector for the positive electrode. Thus, the respective electrodes have been made by dispersing mixtures of the respective binders and active particulate materials in a suitable liquid, depositing the wet mixture as a layer of controlled thickness on the surface of a current collector foil, and drying, pressing, and fixing the resin-bonded electrode particles to their respective current collector surfaces. The positive and negative electrodes may be formed on conductive metal current collector sheets of a suitable area and shape, and cut (if necessary), folded, rolled, or otherwise shaped for assembly into lithium-ion cell containers with suitable porous separators and a liquid electrolyte.

There is a need for improved practices by which the negative electrode (anode) particles and the positive electrode (cathode) particles are composed and prepared. And there is a continuing need for improvements in the methods by which the active electrode material particles are combined with their respective current collector films and formed into electrodes for lithium secondary batteries.

SUMMARY OF THE INVENTION

Practices of this invention are applicable to the preparation of particles of active electrode materials for lithium secondary batteries, such as lithium-ion batteries. Such electrode material particles often have representative particle sizes in the range of about one micrometer to about fifty micrometers. In accordance with practices of this invention, parallel processes are employed and the active electrode material particles are provided with coatings of smaller particles (sub-micron size) of carbon or of particles of a metal oxide. The respective small particle coating compositions are paired with selected active electrode material compositions so as to improve the properties and the function of the electrode material in a specific combination of lithium-ion cell materials.

In accordance with practices of this invention, a coating of carbon particles on particles of an electrode material is suitably formed for the purpose of improving the electrical conductivity of the electrode material, for suppressing undesirable surface reactions to extend cycle life, and/or for improving distribution of a liquid electrolyte in a porous electrode layer of the electrode material. By way of example, a coating of carbon particles may thus improve the performance of positive electrode (cathode) materials like lithium manganese nickel cobalt oxide (NMC), lithium manganese oxide (LMO), lithium cobalt oxide (LCO), lithium nickel cobalt aluminum oxide (NCA), lithium iron phosphate (LFP), and other lithium metal oxides. And carbon coatings may be used in combination with negative electrode (anode) materials such as lithium titanate (LTO), and silicon-based materials such as silicon, silicon alloys, SiOx, and LiSi alloys.

A thin coating of a polymer is initially formed on the surfaces of a collected or contained mass of active material particles. The polymer coating is to be carbonized on the surfaces of the electrode material particles in a gas stream subjected to an atmospheric plasma, preferably as the carbon-coated electrode particles are deposited by the stream onto a cell substrate intended to be in contact with the electrode material.

The proportions of the polymer and the body of particles are determined such that substantially each active material particle may be coated with a thin layer of the polymer such that when the polymer is carbonized in an atmospheric plasma, each particle of active electrode material carries a coating of carbon particles. Examples of suitable carbon polymers for carbonization in an atmospheric plasma include polyethylene (PE), polypropylene (PP), polyacrylic acid (PAA), and other vinyl polymers. In general, it is preferred to use polymers composed of carbon and hydrogen or carbon, hydrogen, and oxygen to simplify the carbonization of the polymer on the surfaces of the electrode particles. Relatively low molecular weight polymers that are readily dissolved in a vaporizable solvent for the coating process are preferred.

The polymer coating process comprises forming a polymer solution in a suitable solvent, for example, either water or suitable organic solvent, such as ethanol. The particles of electrode material are mixed and soaked with the polymer solution to form a coating of the polymer on the surfaces of the micron-size particles of active material. Excess polymer solution is removed by filtration or other separation step. The particles of electrode material are dried to form a like polymer coating on the surfaces of each particle of electrode material. As will be described in more detail below in this specification, the carbon coated particles of active material are then introduced into a stream of air or other suitable gas flowing in and through an atmospheric plasma generator. As the polymer coated particles are passed momentarily through the plasma, generated at suitable energy and temperature levels, the polymer is carbonized as hydrogen and other constituents of the polymer are volatilized and removed, and the active material particles with their coatings of nanometer-size carbon particles are directed onto a desired substrate, such as, for example, a current collector foil that is compatible with the electrode material or a thin layer of porous separator material.

As stated above, an alternative, analogous process may be used to form a coating of metal oxide particles on the surfaces of particles of active electrode materials. A coating of metal oxide particles may be employed on active material particles for a variety of reasons that complement and enhance the function of the active electrode material as it serves in combination with an electrolyte and an opposing electrode material in a lithium-ion electrochemical cell.

By way of example, active electrode materials that may benefit from a coating of nanometer-size metal oxide particles include positive electrode materials like lithium manganese nickel cobalt oxide (NMC), lithium manganese oxide (LMO), lithium cobalt oxide (LCO), lithium nickel cobalt aluminum oxide (NCA), lithium iron phosphate (LFP), and other lithium metal oxides, as well as negative electrode materials like lithium titanate (LTO), and silicon-based materials such as silicon, silicon alloys, SiOx, and LiSi alloys.

The coating of metal oxide particles is typically suitably formed by first coating the surfaces of the particles of active electrode material with a liquid soluble or dispersible, oxygen-containing, precursor compound of the selected metal oxide. Such precursor compounds may comprise (i) metal hydroxides, such as $Al(OH)_3$, $Mg(OH)_2$, $Zr(OH)_2$, (ii) metal carbonates, such as $Al_2(CO_3)_3$, $MgCO_3$, $ZrCO_3$, and (iii) metal nitrates such as $Al(NO_3)_3$, $Mg(NO_3)_2$, $Zr(NO_3)_2$. A suitable coating process may comprise first forming a liquid solution of a dissolved metal precursor compound or a dispersion of suspended very fine particles of the metal precursor in water, alcohol, or other suitable liquid. The particles of electrode material are mixed with the solution or dispersion to achieve uniform mixing and coating of the metal oxide precursor on the surfaces of the micrometer-size particles of active electrode material. The coated particles are separated from any excess solution or dispersion and the coated particles of active material are dried as necessary, and subsequently milled, if necessary, to control coating thickness and uniformity of the metal oxide particle precursors on the surfaces of the particles of electrode material.

The metal oxide precursor particles coated on the surfaces of the active material particles (micrometer-size) are then processed by suspension and flow in an air or inert gas through an atmospheric plasma generator resulting in substantially pure metal oxide particles of nanometer size on the surfaces of the active material particles.

The coating of metal oxide particles on active material particles may be employed for various alternative reasons. For example, the metal oxide particles may be used to suppress undesirable side reactions at the interface between electrolyte and the active material particles that may lead to premature cell degradation. The combination of metal oxide particles and active material particles may improve coulomb efficiency of the lithium-ion electrochemical cell, the cycle life of the cell, the power performance of the cell, and/or the overcharge tolerance of the cell.

The processing of the precursor coated particles of active electrode material in the flowing atmospheric plasma stream may be used to accumulate a quantity of electrode material for later incorporation into a lithium battery construction. However, in general, it is preferred to deposit the coated electrode particles, for example, directly onto the surface of a current collector foil or onto the surface of a separator member in the making of a lithium-ion cell or other secondary lithium battery member.

For example, carbon-coated lithium titanate particles as a negative electrode material may be used in combination with metal oxide-coated NMC particles as a positive electrode material. In the preparation of the negative electrode material a first plasma spray apparatus is used, for example, to carry and decarbonize hydrocarbon polymer-coated lithium titanate particles and to direct them against the surface of a copper or aluminum current collector foil. Simultaneously, a second plasma spray apparatus is used to co-direct metal particles of, for example, copper or tin, at the same location on the current collector foil to provide a suitable quantity of submicron metal particles as binder particles for the co-deposited carbon particle-coated lithium titanate particles. The two atmospheric plasma streams are coordinated and moved together to progressively coat a surface of the current collector foil with a uniformly thick layer of metal particle-bonded, carbon particle-coated, lithium titanate particles to the surface of the current collector foil as a negative electrode material for a lithium-ion cell.

Likewise, a first atmospheric plasma spray apparatus may be used to carry a stream of lithium manganese nickel cobalt oxide (NMC) particles, coated with smaller metal oxide precursor particles, and to direct the particles onto a surface of an aluminum foil current collector. As the metal oxide precursor material is carried through the plasma the precursor material is oxidized to corresponding metal oxide particles. Again, a second plasma spray apparatus is used to co-direct metal particles of, for example, copper or tin, at the same location on the current collector foil to provide a suitable quantity of submicron metal particles as binder particles for the co-deposited metal oxide particle coated NMC particles. The two atmospheric plasma streams are coordinated and moved together to progressively coat a surface of the current collector foil with a uniformly thick layer of metal particle-bonded, metal oxide particle-coated, NMC particles to the surface of the current collector foil as a positive electrode material for a lithium-ion cell.

Like sized and shaped, thus prepared, negative and positive electrode members may be assembled on opposite sides of a suitable, coextensive, porous separator member in a cell container. Lithium-ion cell assembly further comprises infiltration of the electrodes and separator with a suitable lithium-ion conducting electrolyte. Typically, the electrolyte is a liquid solution of a lithium electrolyte composition, such as lithium hexafluorophosphate (LiPF$_6$) in an organic solvent.

Other objects and advantages of the invention will be apparent from a description of illustrative examples of practices of the invention which follow in this specification.

DESCRIPTION OF PREFERRED EMBODIMENTS

An illustrative lithium-ion cell will be described, in which electrode members can be prepared using practices of this invention.

Figure 1:
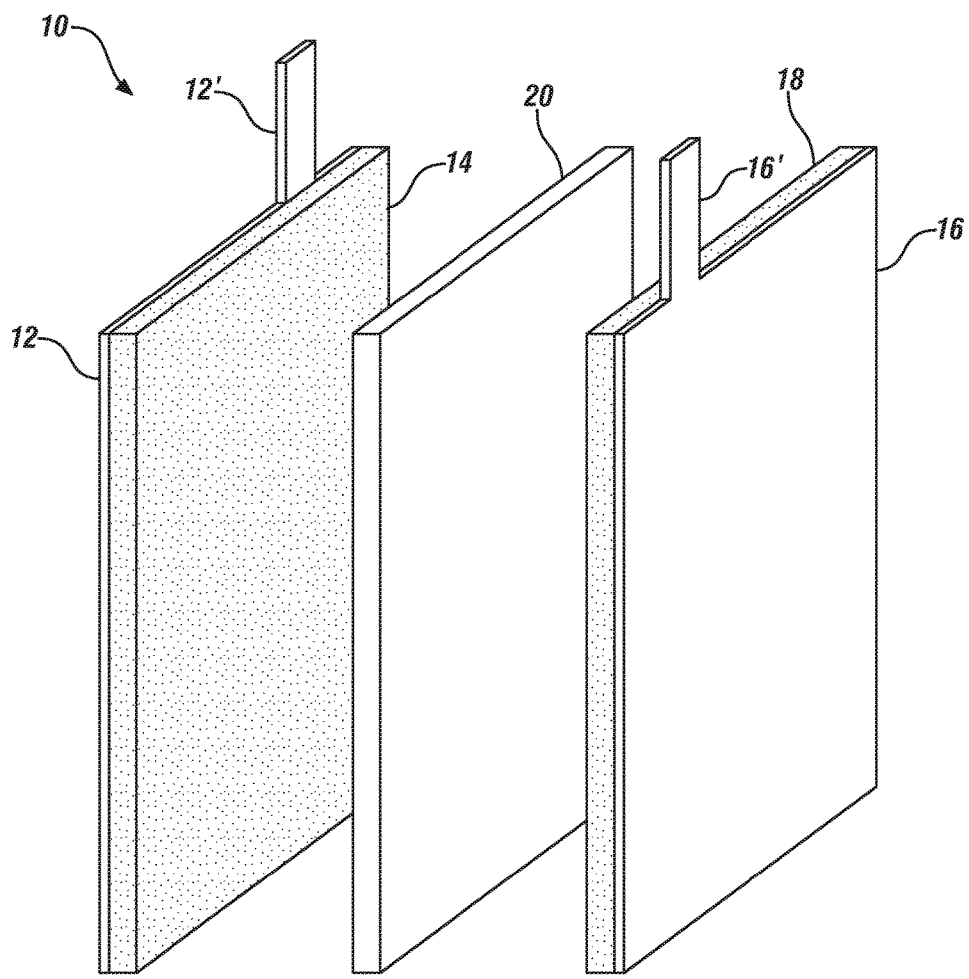
FIG. 1 is an enlarged schematic illustration of the anode, separator, and cathode elements of a lithium-ion cell depicting an anode and a cathode, each comprising a metal current collector carrying a porous layer of deposited particles of active electrode material and deposited particles of negative electrode material formed in accordance with coating practices of this invention.

FIG. 1 is an enlarged schematic illustration of a spaced-apart assembly 10 of three solid members of a lithium-ion electrochemical cell. The three solid members are spaced apart in this illustration to better show their structure. The illustration does not include a liquid electrolyte solution whose composition and function will be described in more detail below in this specification. Practices of this invention are typically used in the manufacture of particles of coated electrode material for deposit as electrode members of the lithium-ion cell when the electrodes are used in the form of relatively thin, layered structures. The particles of electrode material are coated with smaller particles of carbon or of a metal oxide depending on the requirements of a specific lithium-ion cell.

In FIG. 1, a negative electrode comprises a relatively thin, electrically conductive metal foil current collector 12. In many lithium-ion cells, the negative electrode current collector 12 is suitably formed of a thin layer of copper or stainless steel. The thickness of metal foil current collector is suitably in the range of about five to twenty-five micrometers. The current collector 12 has a desired two-dimensional plan-view shape for assembly with other solid members of a cell. Current collector 12 is illustrated as rectangular over its principal surface, and further provided with a connector tab 12' for connection with other electrodes in a grouping of lithium-ion cells to provide a desired electrical potential or electrical current flow.

Deposited on the negative electrode current collector 12 is a thin, layer of porous particulate negative electrode material 14. Suitable negative electrode materials include, for example, lithium titanate (LTO), and silicon-based materials such as silicon, silicon alloys (including LiSi alloys), and SiOx. In accordance with practices of this invention, the particles of negative electrode material may coated with sub-micron size particles of carbon or of a metal oxide using a process comprising suitable exposure of the particles in an atmospheric plasma. The coated electrode particles may also be deposited on a current collector foil (or a separator element) using an atmospheric plasma generating apparatus. As illustrated in FIG. 1, the layer of negative electrode material 14 is typically co-extensive in shape and area with the main surface of its current collector 12 and bonded to it. The electrode material has sufficient porosity to be infiltrated by a liquid, lithium-ion containing electrolyte. The thickness of the rectangular layer of negative electrode material may be up to about two hundred micrometers, so as to provide a desired current and power capacity for the negative electrode. As will be further described, the negative electrode material may be applied so that one large face of the negative electrode material 14 is bonded to a major face of current collector 12 and the other large face of the negative electrode material layer 14 faces outwardly from its current collector 12.

A positive electrode is shown, comprising a positive current collector foil 16 (often formed of aluminum or stainless steel) and a coextensive, overlying, porous resin bonded layer of positive electrode material 18. Suitable positive electrode materials include, for example, lithium manganese nickel cobalt oxide (NMC). Examples of other positive electrode materials include lithium manganese oxide (LMO), lithium cobalt oxide (LCO), lithium nickel cobalt aluminum oxide (NCA), lithium iron phosphate (LFP), and other lithium metal oxides and phosphates. In accordance with practices of this invention the particles of positive electrode material may be coated with nanometer-size particles of carbon or of metal oxide.

Positive current collector foil 16 also has a connector tab 16' for electrical connection with other electrodes in other cells that may be packaged together in the assembly of a lithium-ion battery. The positive current collector foil 16 and its coating of porous positive electrode material 18 are typically formed in a size and shape that are complementary to the dimensions of an associated negative electrode. In the illustration of FIG. 1, the two electrodes are alike in their shapes (but they do not have to be identical), and assembled in a lithium-ion cell with the major outer surface of the negative electrode material 14 facing the major outer surface of the positive electrode material 18. The thicknesses of the rectangular positive current collector foil 16 and the rectangular layer of positive electrode material 18 are typically determined to complement the negative electrode material 14 in producing the intended electrochemical capacity of the lithium-ion cell. The thicknesses of current collector foils are typically in the range of about 5 to 25 micrometers. And the thicknesses of the electrode materials, formed by this precursor material coating and atmospheric plasma treatment and deposition process are up to about 200 micrometers. Again, in accordance with practices of this invention the particles of negative electrode material may be coated with nanometer size particles of carbon or of a metal oxide.

A thin porous separator layer 20 is interposed between the major outer face of the negative electrode material layer 14 and the major outer face of the positive electrode material layer 18. In many battery constructions, the separator material is a porous layer of a polyolefin, such as polyethylene or polypropylene. Often the thermoplastic material comprises inter-bonded, randomly oriented fibers of PE or PP. The fiber surfaces of the separator may be coated with particles of alumina, or other insulator material, to enhance the electrical resistance of the separator, while retaining the porosity of the separator layer for infiltration with liquid electrolyte and transport of lithium ions between the cell electrodes. The separator layer 20 is used to prevent direct electrical contact between the negative and positive electrode material layers 14, 18, and is shaped and sized to serve this function. In the assembly of the cell, the opposing major outer faces of the electrode material layers 14, 18 are pressed against the major area faces of the separator membrane 20. A liquid electrolyte is injected or infiltrated into the pores of the separator membrane 20 and electrode material layers 14, 18.

The electrolyte for the lithium-ion cell is often a lithium salt dissolved in one or more organic liquid solvents. Examples of salts include lithium hexafluorophosphate ($LiPF_6$), lithium tetrafluoroborate ($LiBF_4$), lithium perchlorate ($LiClO_4$), lithium hexafluoroarsenate ($LiAsF_6$), and lithium trifluoroethanesulfonimide. Some examples of solvents that may be used to dissolve the electrolyte salt include ethylene carbonate, dimethyl carbonate, methylethyl carbonate, propylene carbonate. There are other lithium salts that may be used and other solvents. But a combination of lithium salt and liquid solvent is selected for providing suitable mobility and transport of lithium ions in the operation of the cell. The electrolyte is carefully dispersed into and between closely spaced layers of the electrode elements and separator layers. The electrolyte is not illustrated in the drawing figure because it is difficult to illustrate between tightly compacted electrode layers.

Figure 2:
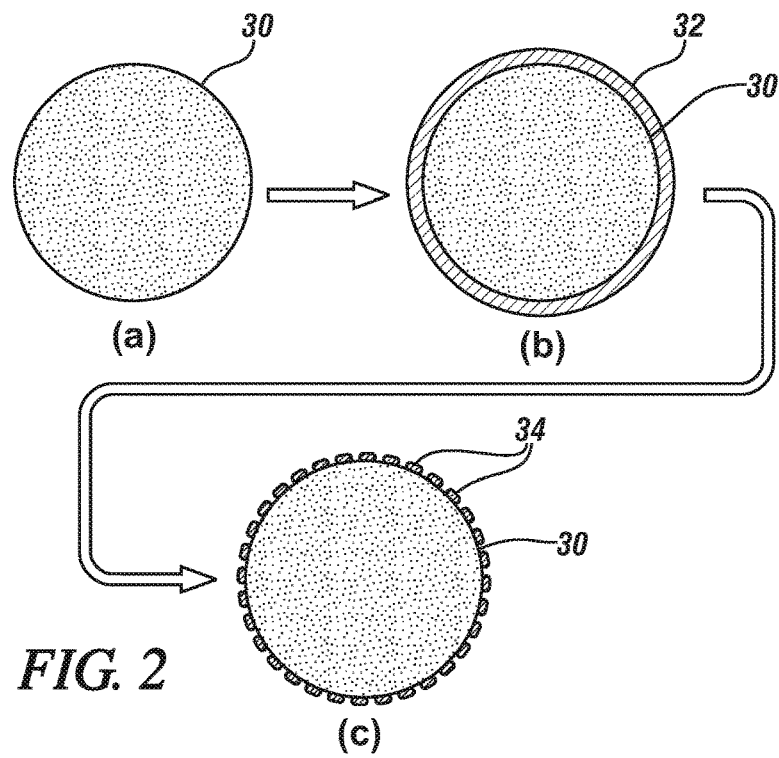
FIG. 2 is a schematic flow diagram illustrating the coating of an individual particle of active material with a precursor layer of a carbon polymer or a metal oxide precursor compound followed by the treatment of the coated particle in an atmospheric plasma to carbonize the polymer to carbon particles or to oxidize the metal oxide precursor to particle of metal oxide on the particle of electrode material.

FIG. 2 is a schematic, cross-sectional illustration of the coating of a single particle of active electrode material. In FIG. 2(a) a single micron-sized particle (typical diameter, for example, about one to fifty micrometers) of electrode material 30 is depicted. Particle 30 would be one of a measured and contained mass of like particles that would be mixed with and coated with a predetermined volume of a solution of a precursor carbon-based polymer or a solution of a metal and oxygen containing compound which serves as a metal oxide compound precursor. Excess fluid is separated from the particles and the particles are dried with their coating of a precursor material. In FIG. 2(a), a coating of precursor material 32 is schematically illustrated on active electrode material particle 20. A mass of precursor-material coated particles, each particle like particle 30 with coating 32 is then ready to be injected into a gas stream in an atmospheric plasma producing device for conversion of the precursor coating into a coating of carbon particles or of metal oxide particles. FIG. 2(c) schematically illustrates an active material particle with a coating 34 of sub-micron particles of carbon or of metal oxide particles. FIG. 2(c) is intended to illustrate a typical coated active material particle as it is carried in a gas or fluid stream exiting an atmospheric plasma device and as it is deposited on a surface of a member of a lithium-ion cell, such a current collector or a separator surface.

Figure 3:
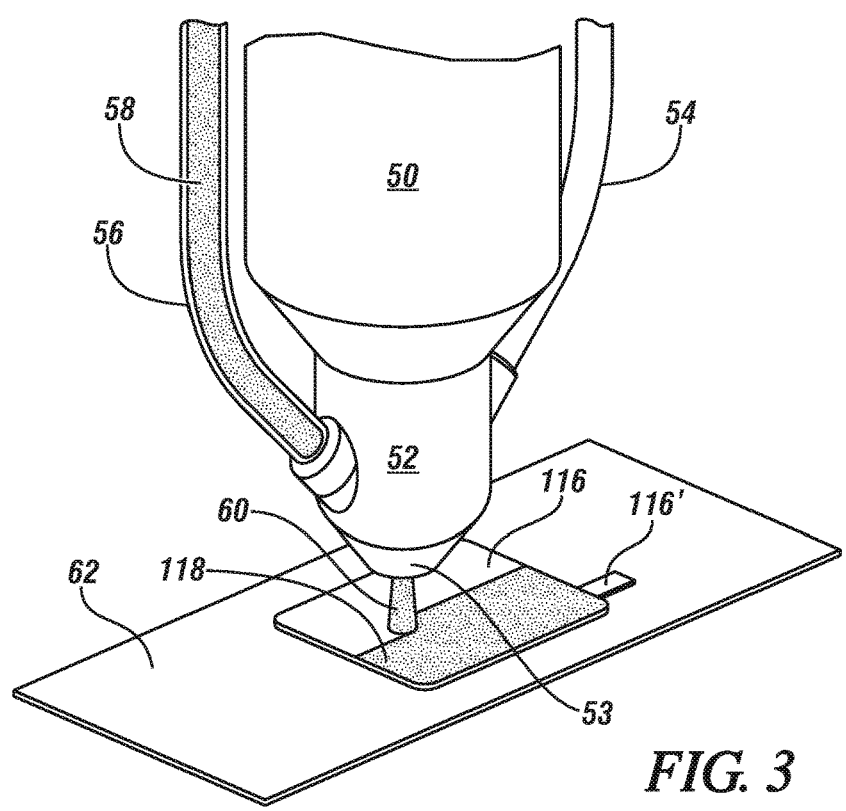
FIG. 3 is a schematic illustration depicting a delivery system for precursor-coated active material particles to an atmospheric plasma device in which the precursor coating is converted to a coating of carbon particles or of metal oxide particles and the heated active material particles, with their intended particle coatings, are immediately deposited on to the surface of a component of a lithium-ion cell.

Atmospheric plasma spray methods are known and plasma spray nozzles are commercially available. In practices of this invention, and with reference to FIG. 3, an atmospheric plasma apparatus may comprise an upstream round flow chamber (shown in partly broken-off illustration at 50 in FIG. 3) for the introduction and conduct of a flowing stream of suitable working gas, such as air, nitrogen, or an inert gas such as helium or argon. The flow of the working gas would be introduced above the broken-off illustration of flow chamber 50 and proceed in a downward direction. In this embodiment, this illustrative initial flow chamber 50 is tapered inwardly to smaller round flow chamber 52. Particles of precursor polymer or metal compound-coated electrode materials 58 are delivered through supply tubes 54, 56 (tube 56 is shown partially broken-away to illustrate delivery of the two-component particles 58) and are suitably introduced into the working gas stream in chamber 52 and then carried into a plasma nozzle 53 in which the air (or other working gas) is converted to a plasma stream at atmospheric pressure. And, for example, particles of a precursor carbon polymer-coated active material composition may be delivered through supply tubes 54 and 56. As the precursor-coated particles 58 enter the gas stream they are dispersed and mixed in it and carried by it. As the stream flows through a downstream plasma-generator nozzle 53, the particles 58 are heated by the formed plasma to a precursor processing temperature and an active material particle deposition temperature. The momentary thermal impact on the particles may be a temperature of from about 300° C. up to about 3500° C. As stated above in this specification, when the active material particles are coated with a carbon polymer precursor, the polymer is carbonized into submicron size elemental carbon particles. And, in the embodiment in which a coating of metal oxide particles is to be formed, the metal-oxygen precursor compound is pyrolized and oxidized, if necessary, to form a coating of submicron metal oxide particles on the particles of active electrode material. In one embodiment of the invention, the suitably coated electrode particles may be collected as they exit the atmospheric plasma device. But in preferred embodiments of the invention, the particles in the atmospheric plasma stream are immediately deposited on a lithium-ion cell member surface as illustrated in FIG. 3.

The stream of air-based plasma and suspended electrode particle material 60 is progressively directed by the nozzle against the surface of a substrate, such as a metal current collector foil 116 for a positive electrode for a lithium-ion cell. The substrate foil 116 is supported on a suitable working surface 62 for the atmospheric plasma deposition process. The deposition substrate for the atmospheric plasma deposition is illustrated in FIG. 3 as an individual current collector foil 116 with its connector tab 116'. But it is to be understood that the substrate for the atmospheric plasma deposition may be of any size and shape for economic use and application of the plasma. It is also to be understood that suitable fixtures may be required to secure the substrate in place and/or a mask may be required to define the coated area or areas. And further, for example, specified smaller working electrode members may later be cut from a larger initially coated substrate. The nozzle is moved in a suitable path and at a suitable rate such that the particulate electrode material is deposited as a layer of positive electrode material 118 of specified thickness on the surface of the current collector foil 116 substrate. The plasma nozzle may be carried on a robot arm and the control of plasma generation and the movement of the robot arm be managed under control of a programmed computer. In other embodiments of the invention, the substrate is moved while the plasma is stationary.

As described above in this specification, in some practices of the invention, it may be preferred to use a second atmospheric plasma nozzle to simultaneously deposit small, partially or fully molten metal particles or droplets with the carbon-coated or metal oxide-coated active material particles onto a current collector foil or separator member or other lithium battery component member. The purpose of co-depositing molten metal droplets or particles with the coated active material particles is to provide a binder material to bond the carbon-coated or metal oxide-coated active material particles to each other and to the substrate material. This practice of using a second atmospheric plasma device is disclosed in co-pending application, PCT/CN2014/077211, filed May 12, 2014, and assigned to the assignee of this invention. The contents of the co-pending application are incorporated herein by reference for the purpose of illustrating the co-deposition practice.

Atmospheric plasma generators and nozzles for the methods of the present application are commercially available and may be carried and used on robot arms, under multi-directional computer control, to coat the many surfaces of each planar substrate for a lithium-ion cell module. Multiple nozzles may be required and arranged in such a way that a high coating speed may be achieved in terms coated area per unit of time.

The plasma nozzle typically has a metallic tubular housing which provides a flow path of suitable length for receiving the flow of working gas and dispersed particles of electrode material and for enabling the formation of the plasma stream in an electromagnetic field established within the flow path of the tubular housing. The tubular housing terminates in a conically tapered outlet, shaped to direct the shaped plasma stream toward an intended substrate to be coated. An electrically insulating ceramic tube is typically inserted at the inlet of the tubular housing such that it extends along a portion of the flow passage. A stream of a working gas, such as air, and carrying dispersed particles of metal particle-coated electrode material, is introduced into the inlet of the nozzle. The flow of the air-particle mixture may be caused to swirl turbulently in its flow path by use of a swirl piece with flow openings, also inserted near the inlet end of the nozzle. A linear (pin-like) electrode is placed at the ceramic tube site, along the flow axis of the nozzle at the upstream end of the flow tube. During plasma generation the electrode is powered by a high frequency generator at a frequency of about 50 to 60 kHz (for example) and to a suitable potential of a few kilovolts. The metallic housing of the plasma nozzle is grounded. Thus, an electrical discharge can be generated between the axial pin electrode and the housing.

When the generator voltage is applied, the frequency of the applied voltage and the dielectric properties of the ceramic tube produce a corona discharge at the stream inlet and the electrode. As a result of the corona discharge, an arc discharge from the electrode tip to the housing is formed. This arc discharge is carried by the turbulent flow of the air/particulate electrode material stream to the outlet of the nozzle. A reactive plasma of the air and electrode material mixture is formed at a relatively low temperature. A copper nozzle at the outlet of the plasma container is shaped to direct the plasma stream in a suitably confined path against the surfaces of the substrates for the lithium-ion cell elements. And the plasma nozzle may be carried by a computer-controlled robot to move the plasma stream in multi-directional paths over the planar surface of the substrate material to deposit the electrode material in a continuous thin layer on the thin substrate surface layer. The deposited plasma-activated material forms an adherent porous layer of bonded electrode material particles on the current collector foil surface.

The as formed carbon particle-coated, or metal oxide particle-coated, electrode material particles may thus be directly deposited on a lithium cell substrate member in a battery electrode-making process using an atmospheric plasma source. As stated, a binder material may be co-deposited with the coated active electrode material if it is required. In many practices, the carbon or metal oxide particle-coated electrode material is deposited on a current collector substrate using atmospheric plasma. The resulting electrode may then be stacked with a separator member and combined with an opposing electrode member, made using a complementary metal coated electrode material. In another practice, metal particle coated electrode material particles may be deposited on a porous separator member using atmospheric plasma. And a layer of current collector material may be deposited to the upper side of the deposited electrode material.

The total coating thickness can reach up to a few hundred microns depending on the electrode materials used and plasma processing conditions. Its wide thickness range makes the process versatile for both energy and power cell applications. In contrast to the current wet-transfer coating method of making battery electrodes, by eliminating the need for slurry, wet coating, drying and pressing processes, cell manufacturing cycle time and cost can be greatly reduced.

The invention claimed is:

1. A method of preparing a coating of sub-micron size carbon particles or of metal oxide particles on surfaces of particles of an active electrode material for a lithium secondary battery, the active electrode material particles having largest dimensions in the range of about one to fifty micrometers; the method comprising:
   coating the surfaces of a quantity of particles of active electrode material with a liquid dispersion of either (i) a carbon-based polymer or (ii) a metal and oxygen-containing compound, and removing the liquid from the surfaces of the active material particles; and
   inserting the (i) carbon-based polymer coated or (ii) the metal and oxygen-containing compound coated active material particles into a atmospheric plasma stream to (i) carbonize the carbon based polymer coating or (ii) to oxidize the metal and oxygen-containing coating to form active electrode material particles coated with (i) submicron size carbon particles or (ii) sub-micron size metal oxide particles.

2. A method of coating sub-micron size particles on particles of active electrode material as recited in claim 1 in which the coated active electrode material particles in the atmospheric plasma stream are deposited as a continuous layer on a cell substrate layer which is a structural member for a lithium secondary cell, the substrate being a porous separator layer or a metallic current collector layer, the thickness of the deposited layer of coated active material particles being up to about 200 micrometers.

3. A method of coating sub-micron size particles on particles of active electrode material as recited in claim 1 in which a hydrocarbon polymer or a vinyl polymer is used to coat the active material particles.

4. A method of coating sub-micron size particles on particles of active electrode material as recited in claim 1 in which the active material particles are coated with a metal and oxygen containing compound which is a hydroxide, carbonate, or nitrate compound, the metal component of the compound being at least one of aluminum, magnesium, and zirconium.

5. A method of coating sub-micron size particles on particles of active electrode material as recited in claim 1 in which cathode material particles are coated and the cathode material particles comprise at least one of lithium manganese nickel cobalt oxide (NMC), lithium manganese oxide (LMO), lithium cobalt oxide (LCO), lithium nickel cobalt aluminum oxide (NCA), and lithium iron phosphate (LFP).

6. A method of coating sub-micron size particles on particles of active electrode material as recited in claim 1 in which anode material particles are coated and the anode material particles comprise at least one of lithium titanate, silicon, silicon alloys, SiOx, and LiSi alloys.

7. A method of preparing a coating of sub-micron size carbon particles on surfaces of particles of an active electrode material for a lithium secondary battery, the active electrode material particles having largest dimensions in the range of about one to fifty micrometers; the method comprising:
    coating the surfaces of a quantity of particles of active electrode material with a liquid dispersion of a carbon-based polymer and removing the liquid from the surfaces of the active material particles; and
    inserting the carbon-based polymer-coated active material particles into a atmospheric plasma stream to carbonize the carbon based polymer coating to form active electrode material particles coated with submicron size carbon particles.

8. A method of coating sub-micron size carbon particles on particles of active electrode material as recited in claim 7 in which the coated active electrode material particles in the atmospheric plasma stream are deposited as a continuous layer on a cell substrate layer which is a structural member for a lithium secondary cell, the substrate being a porous separator layer or a metallic current collector layer, the thickness of the deposited layer of carbon coated active material particles being up to about 200 micrometers.

9. A method of coating sub-micron size carbon particles on particles of active electrode material as recited in claim 7 in which a hydrocarbon polymer or a vinyl polymer is used to coat the active material particles.

10. A method of coating sub-micron size carbon particles on particles of active electrode material as recited in claim 7 in which cathode material particles are coated and the cathode material particles comprise at least one of lithium manganese nickel cobalt oxide (NMC), lithium manganese oxide (LMO), lithium cobalt oxide (LCO), lithium nickel cobalt aluminum oxide (NCA), and lithium iron phosphate (LFP).

11. A method of coating sub-micron size carbon particles on particles of active electrode material as recited in claim 7 in which anode material particles are coated and the anode material particles comprise at least one of lithium titanate, silicon, silicon alloys, SiOx, and LiSi alloys.

12. A method of preparing a coating of sub-micron size particles of metal oxide particles on surfaces of particles of an active electrode material for a lithium secondary battery, the active electrode material particles having largest dimensions in the range of about one to fifty micrometers; the method comprising:
    coating the surfaces of a quantity of particles of active electrode material with a liquid dispersion of a metal and oxygen-containing compound, and removing the liquid from the surfaces of the active material particles; and
    inserting the metal and oxygen-containing compound coated active material particles into a atmospheric plasma stream to oxidize the metal and oxygen-containing coating to form active electrode material particles coated with sub-micron size metal oxide particles.

13. A method of coating sub-micron size metal oxide particles on particles of active electrode material as recited in claim 12 in which the metal oxide-coated active electrode material particles in the atmospheric plasma stream are deposited as a continuous layer on a cell substrate layer which is a structural member for a lithium secondary cell, the substrate being a porous separator layer or a metallic current collector layer, the thickness of the deposited layer of coated active material particles being up to about 200 micrometers.

14. A method of coating sub-micron size metal oxide particles on particles of active electrode material as recited in claim 12 in which the active electrode material particles are coated with a metal and oxygen containing compound which is a hydroxide, carbonate or nitrate compound, the metal component of the compound being at least one of aluminum, magnesium, and zirconium.

15. A method of coating sub-micron size metal oxide particles on particles of active electrode material as recited in claim 12 in which cathode material particles are coated and the cathode material particles comprise at least one of lithium manganese nickel cobalt oxide (NMC), lithium manganese oxide (LMO), lithium cobalt oxide (LCO), lithium nickel cobalt aluminum oxide (NCA), and lithium iron phosphate (LFP).

16. A method of coating sub-micron size metal oxide particles on particles of active electrode material as recited in claim 12 in which anode material particles are coated and the anode material particles comprise at least one of lithium titanate, silicon, silicon alloys, SiOx, and LiSi alloys.

17. A method of coating sub-micron size carbon particles on particles of active electrode material as recited in claim 7 in which the coated active electrode material particles in the atmospheric plasma stream and metal particles in a separate atmospheric plasma stream are at least partially melted and are co-directed with the coated active material particles against and deposited as a continuous layer on a cell substrate layer which is a structural member for a lithium secondary cell, the substrate being a porous separator layer or a metallic current collector layer, the thickness of the deposited layer of carbon coated active material particles being up to about 200 micrometers, the at least partially melted metal particles solidifying and serving to bond the carbon-coated particles of active electrode material to each other and to the substrate.

18. A method of coating sub-micron size metal oxide particles on particles of active electrode material as recited in claim 13 in which the coated active electrode material particles in the atmospheric plasma stream and metal particles in a separate atmospheric plasma stream are at least partially melted and are co-directed with the coated active material particles against and deposited as a continuous layer on a cell substrate layer which is a structural member for a lithium secondary cell, the substrate being a porous separator layer or a metallic current collector layer, the thickness of the deposited layer of metal oxide coated active material particles being up to about 200 micrometers, the at least partially melted metal particles solidifying and serving to bond the carbon-coated particles of active electrode material to each other and to the substrate.

* * * * *